Figure 1:
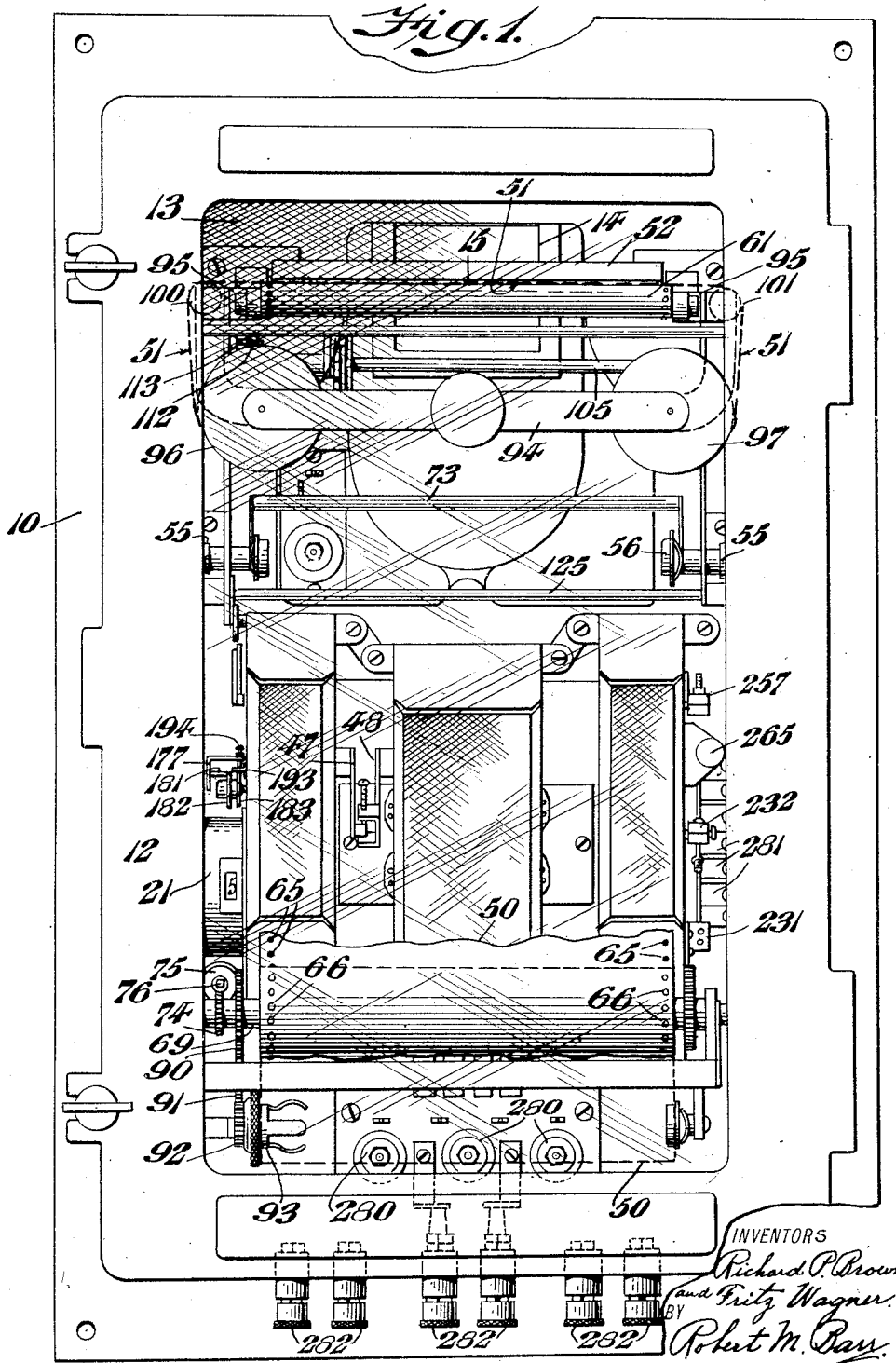

R. P. BROWN AND F. WAGNER.
MULTIPLE RECORDING INSTRUMENT.
APPLICATION FILED JULY 1, 1920.

1,422,920. Patented July 18, 1922.
12 SHEETS—SHEET 2.

INVENTORS
Richard P. Brown
and Fritz Wagner.
BY Robert M. Bair
ATTORNEY

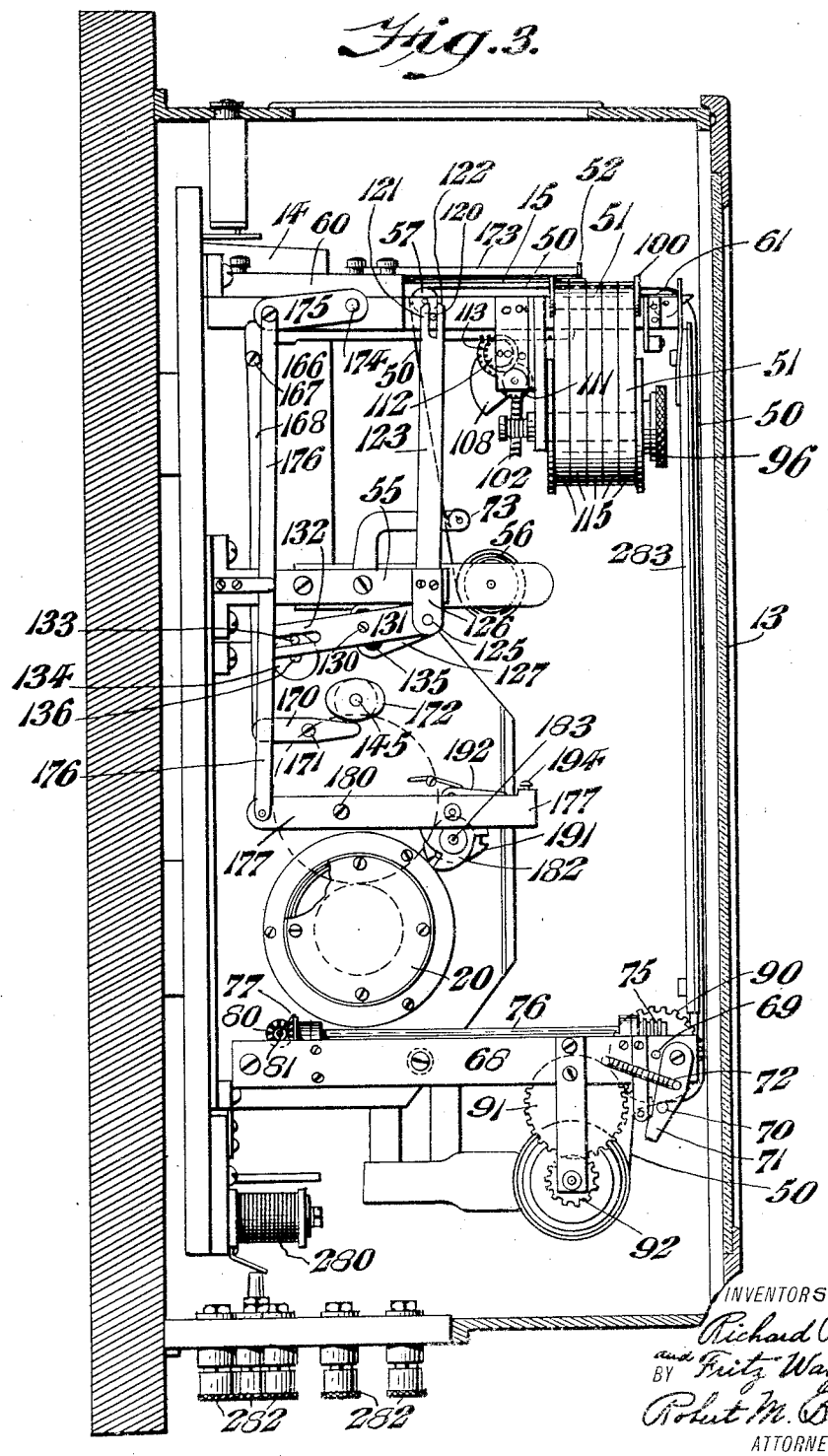

R. P. BROWN AND F. WAGNER.
MULTIPLE RECORDING INSTRUMENT.
APPLICATION FILED JULY 1, 1920.
1,422,920.
Patented July 18, 1922.
12 SHEETS—SHEET 4.
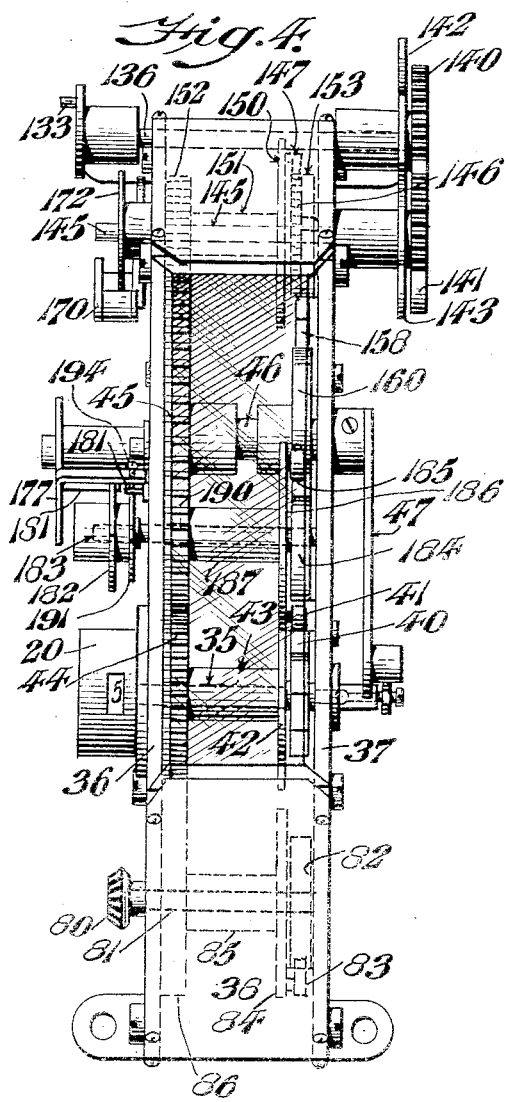
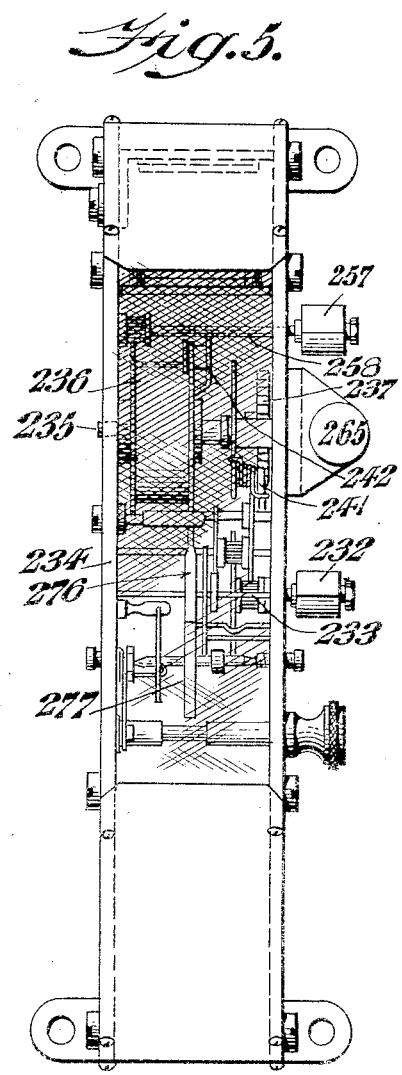
INVENTORS
Richard P. Brown
and Fritz Wagner.
BY
Robert M. Barr
ATTORNEY

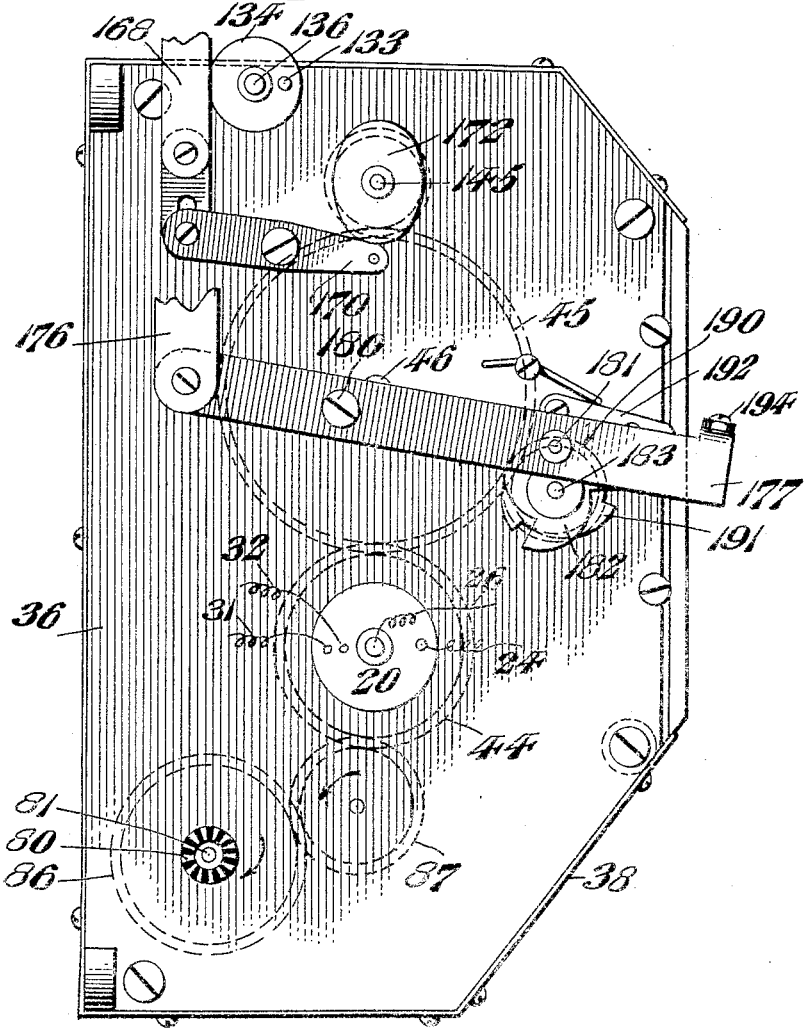

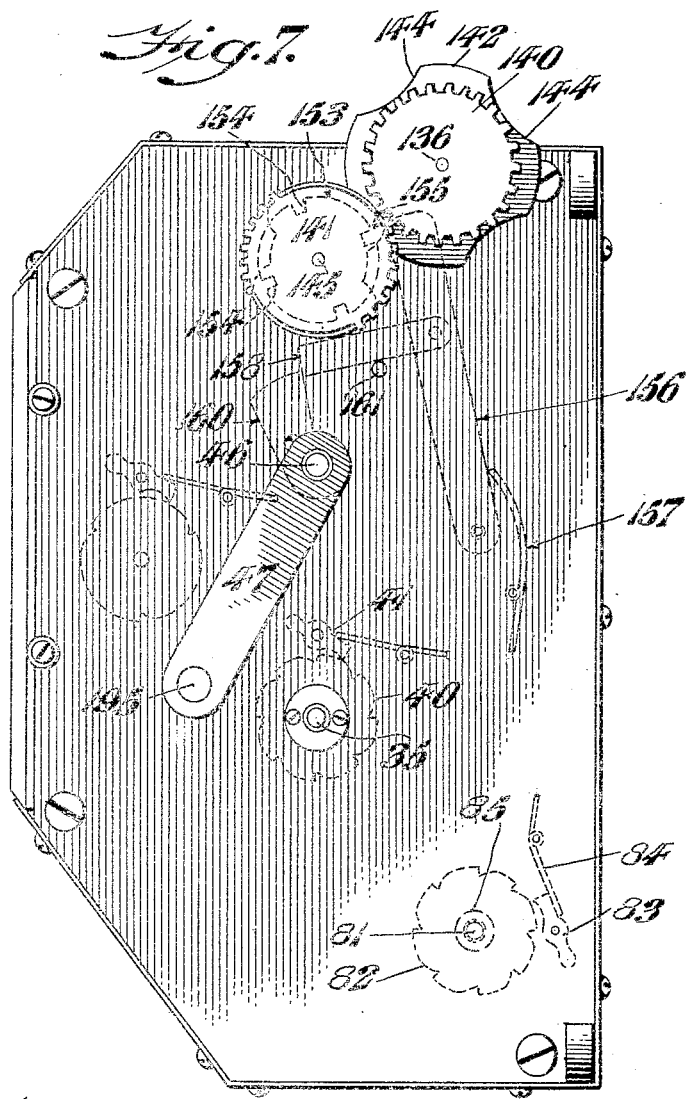

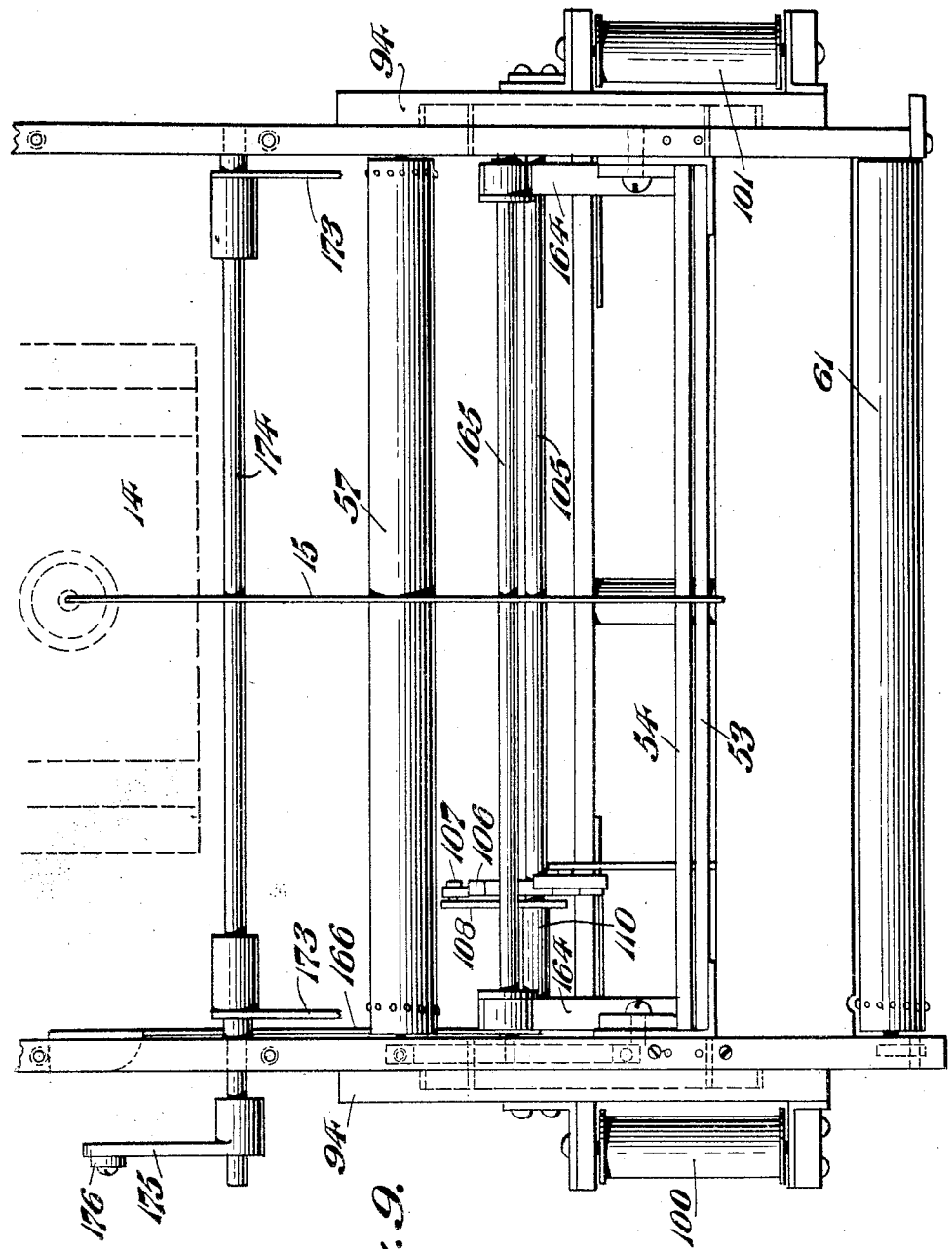

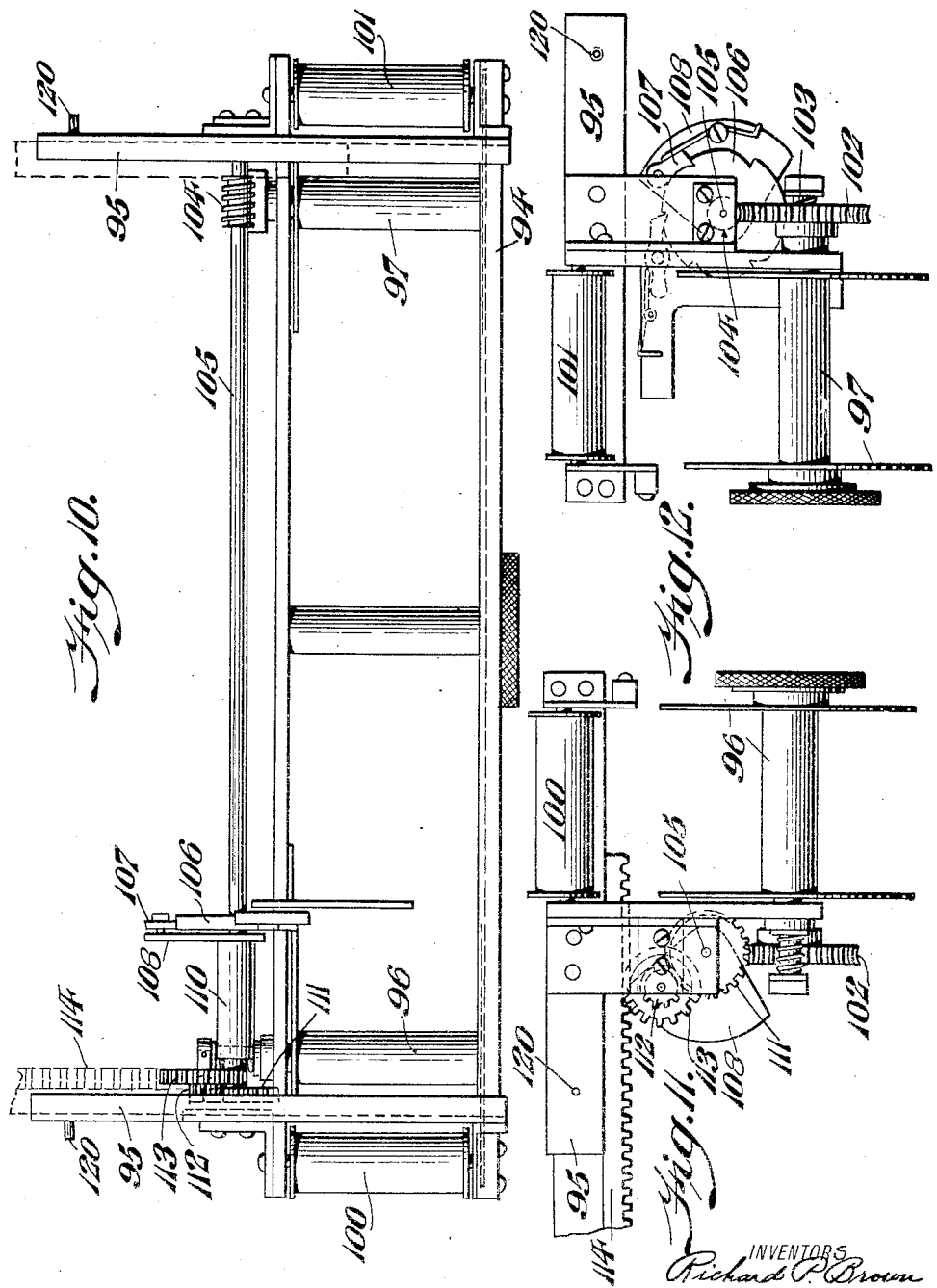

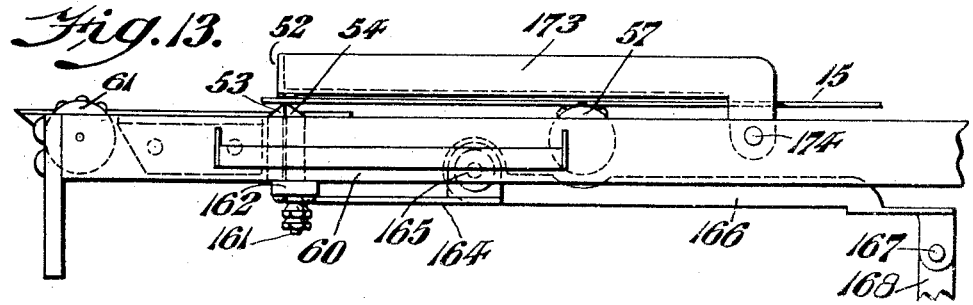
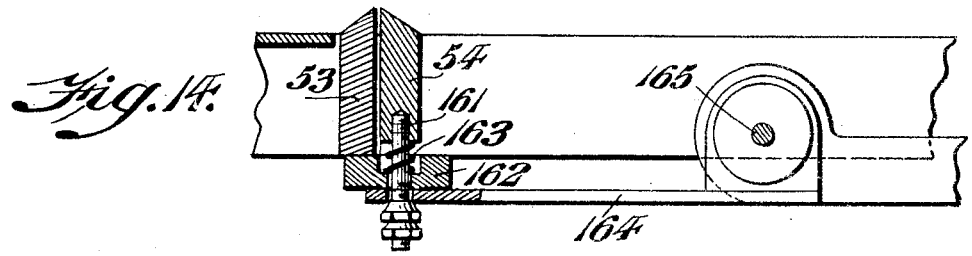
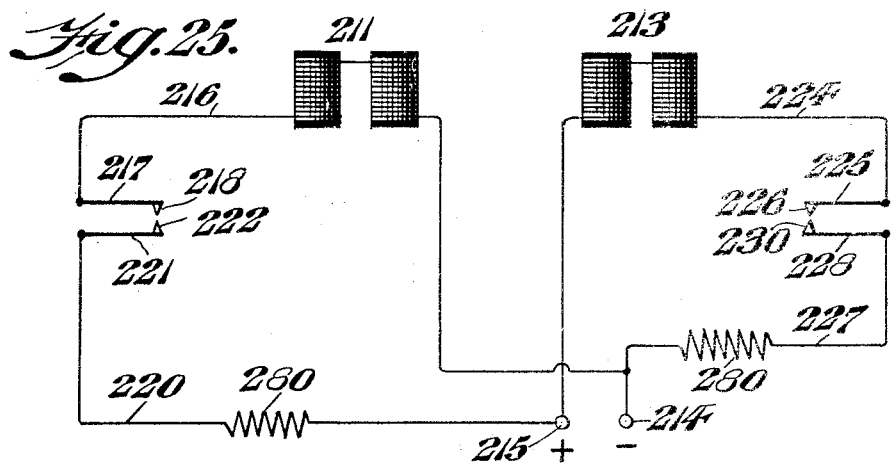
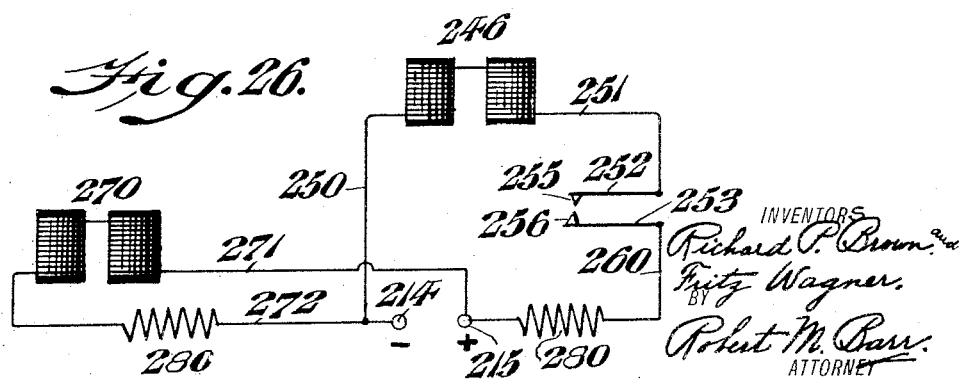

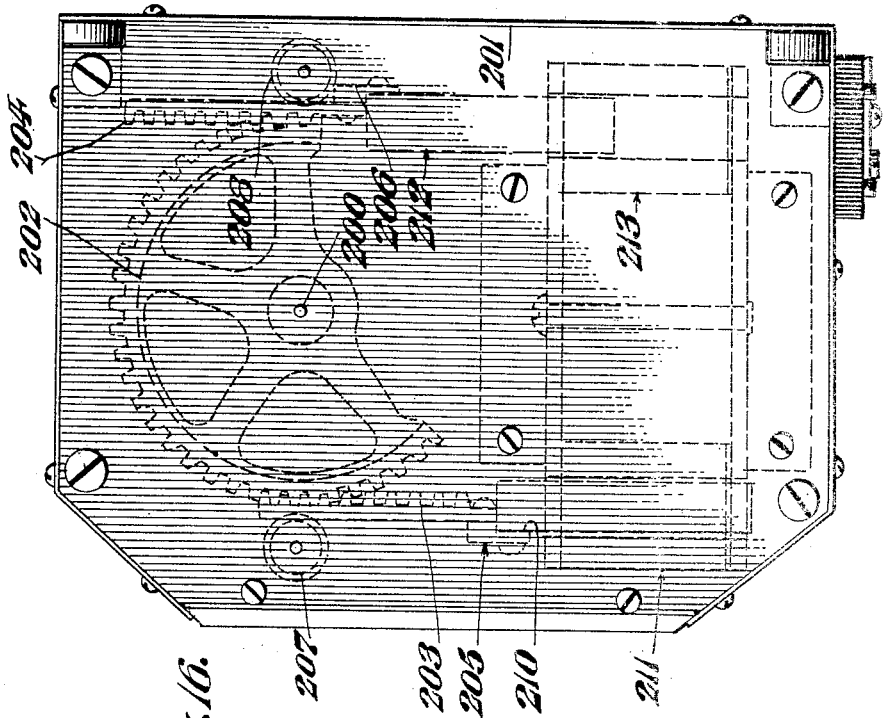
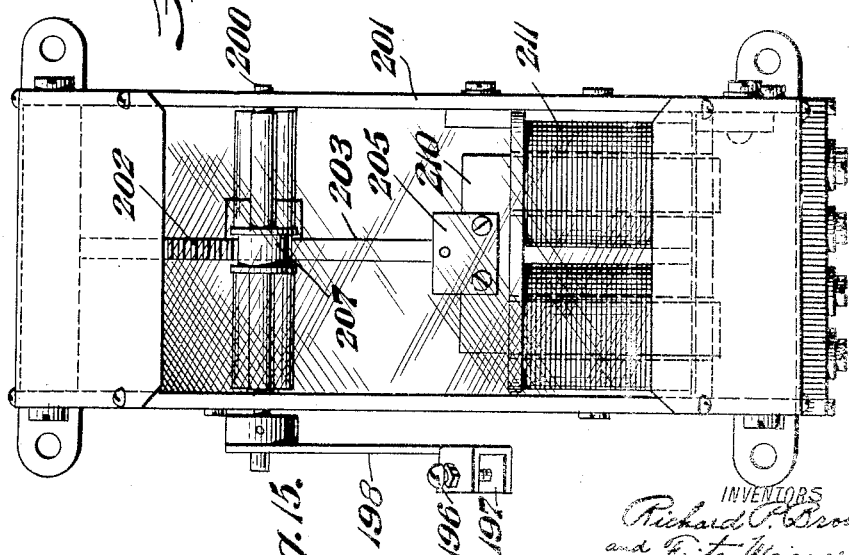

BEST AVAILABLE COP'

R. P. BROWN AND F. WAGNER.
MULTIPLE RECORDING INSTRUMENT.
APPLICATION FILED JULY 1, 1920.

1,422,920.

Patented July 18, 1922.
12 SHEETS—SHEET 11.

INVENTORS
Richard P. Brown
and Fritz Wagner.
BY Robert M. Barr.
ATTORNEY

R. P. BROWN AND F. WAGNER.
MULTIPLE RECORDING INSTRUMENT.
APPLICATION FILED JULY 1, 1920.

1,422,920.

Patented July 18, 1922.
12 SHEETS—SHEET 12.

INVENTORS
Richard P. Brown
and Fritz Wagner.
BY
Robert M. Barr
ATTORNEY

UNITED STATES PATENT OFFICE.

RICHARD P. BROWN AND FRITZ WAGNER, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

MULTIPLE-RECORDING INSTRUMENT.

1,422,920.   Specification of Letters Patent.   Patented July 18, 1922.

Application filed July 1, 1920. Serial No. 393,423.

*To all whom it may concern:*

Be it known that we, RICHARD P. BROWN and FRITZ WAGNER, citizens of the United States, residing at Philadelphia, county of Philadelphia, State of Pennsylvania, have invented certain new and useful Improvements in Multiple-Recording Instruments, of which the following is a specification.

Some of the objects of the present invention are to provide an instrument for separately recording a plurality of conditions, such as temperature, existing respectively at a plurality of locations; to provide means for electrically operating an instrument to make a plurality of records, each record representing a condition prevailing at one of a plurality of units, such as a battery of furnaces; to provide an electrically controlled timing mechanism arranged to actuate a multiple recording instrument and operated automatically to be maintained continuously in condition to function; to provide means for distinguishing the record of any unit from any other unit with respect to which the instrument is responsive; to provide means for causing a double dot or indication to be made upon a chart; to provide means for intermittently changing the recording mechanism to make either a single or a double dot as desired; to provide means for changing the color of the record to be made upon the chart; to provide means for causing the depressor bar of a recording instrument to be operated by gravity; to provide means for feeding a chart automatically and in timed relation to the recording mechanism of a recording instrument; to provide a recording instrument arranged to successively respond to a plurality of thermo-couples; to provide means for selectively controlling a plurality of thermo-couples to cause each or any one to be recorded with a distinguishing characteristic upon a record chart; and to provide other improvements as will hereinafter appear.

Figure 2:
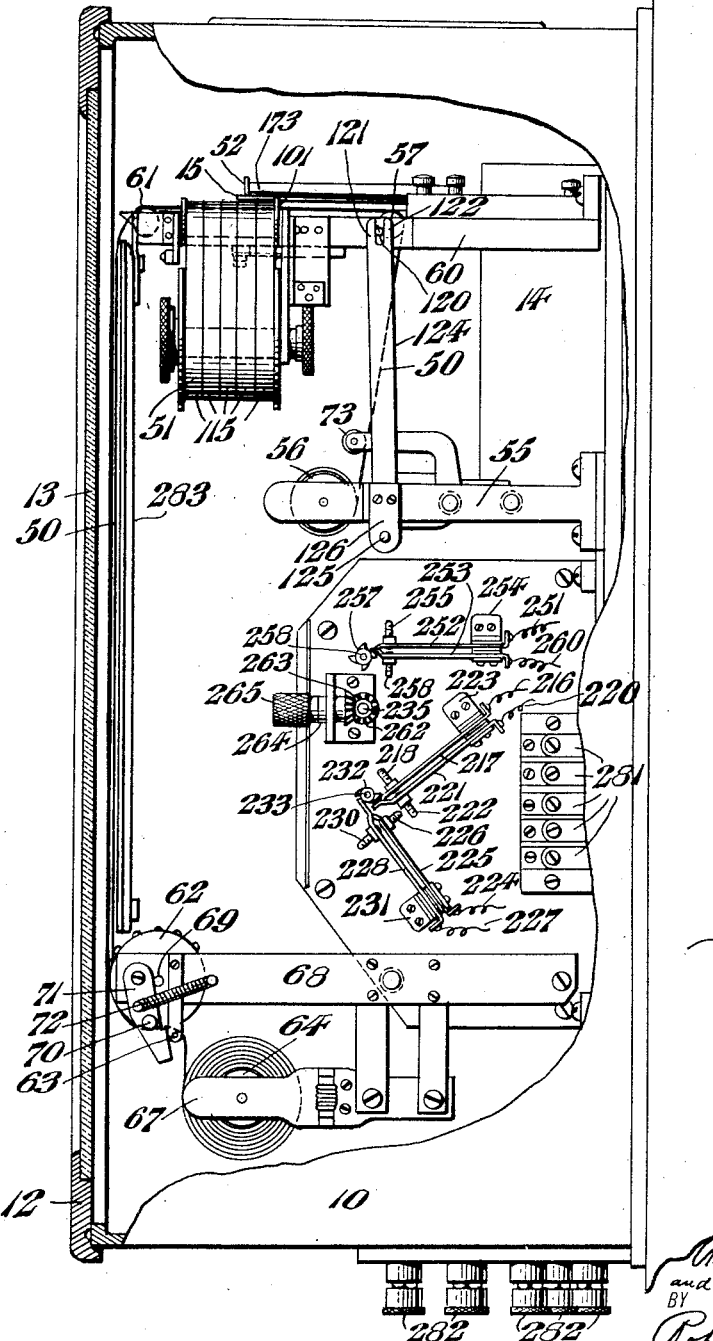
Figure 17:
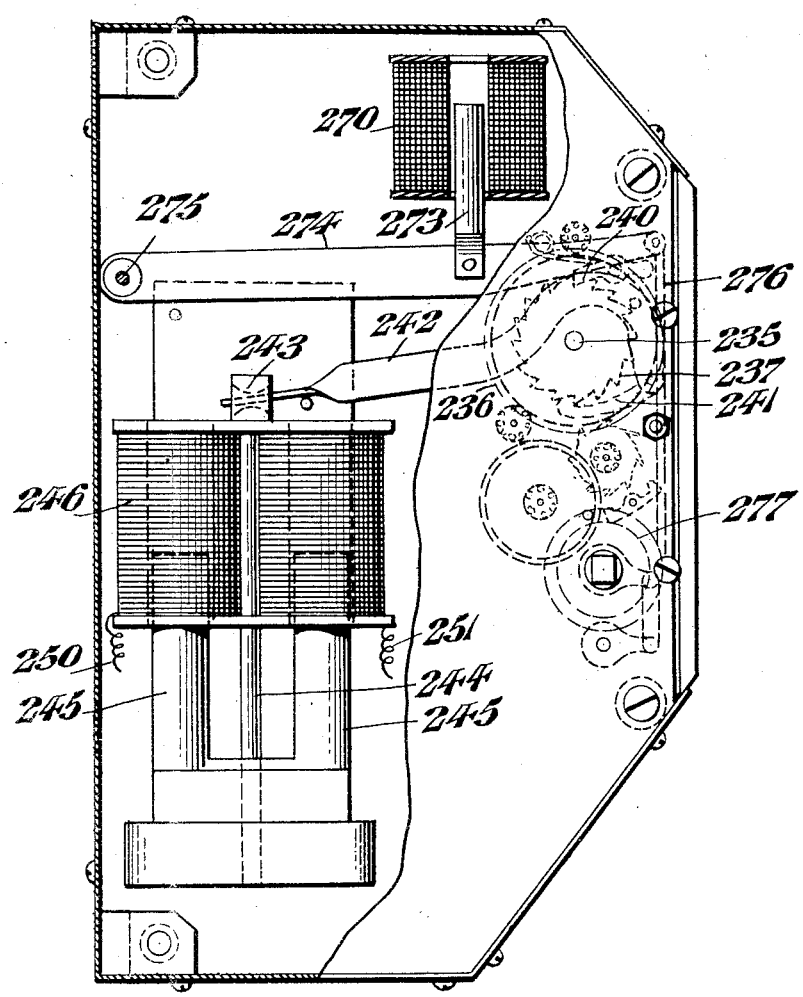
Figure 18:
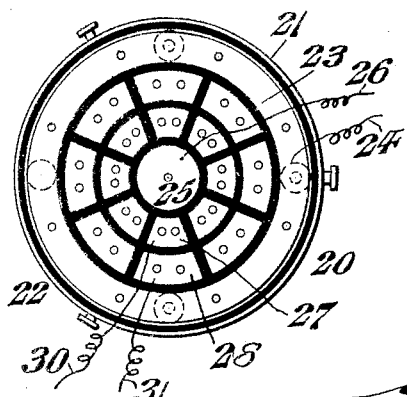
Figure 19:
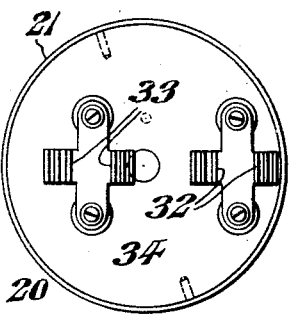
Figure 20:
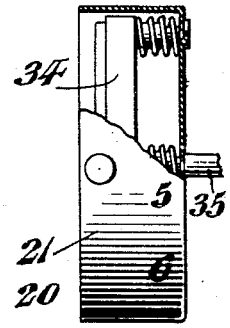
Figure 21:
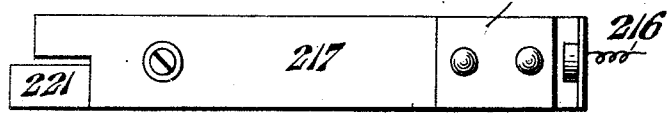
Figure 22:
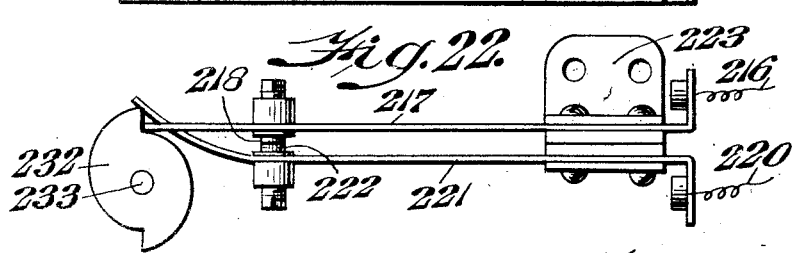
Figure 23:
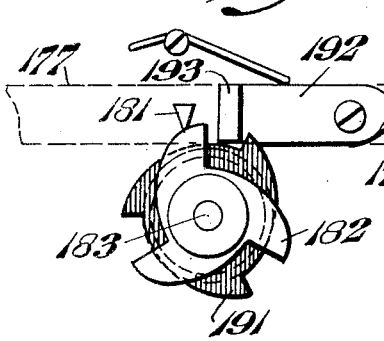
Figure 24:
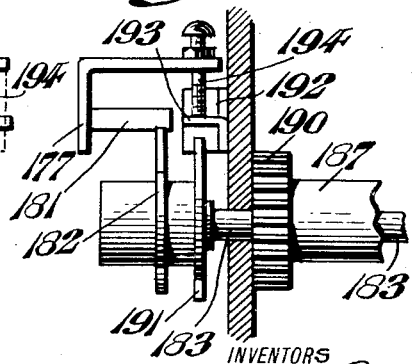

In the accompanying drawings, Fig. 1 represents a front elevation of a recording instrument embodying the present invention; Fig. 2 represents one side elevation, with the casing broken away, of the same; Fig. 3 represents the other side elevation of the instrument, also with the casing broken away; Fig. 4 represents a front elevation of one form of operating control mechanism; Fig. 5 represents a front elevation of one form of timing mechanism; Fig. 6 represents one side elevation of the operating control mechanism; Fig. 7 represents the other side elevation of the operating control mechanism; Fig. 8 represents a sectional detail of the general ratchet and pawl construction employed in the control mechanism; Fig. 9 represents a plan showing the recording adjuncts of the instrument; Fig. 10 represents a detail in plan of the ribbon mechanism; Figs. 11 and 12 represent respectively end elevations of the ribbon mechanism; Fig. 13 represents a detail in side elevation of the depressor bar and the recording adjuncts; Fig. 14 represents a detail in section of the movable knife and its adjuncts; Fig. 15 represents a front elevation of one form of electric control for the operating mechanism; Fig. 16 represents a side elevation of the same; Fig. 17 represents an elevation, partly broken away, of one side of the timing mechanism; Figs. 18 and 19 represent respectively details of one form of commutator control switch; Fig. 20 represents a detail, partly in section, of the contactor element of the switch; Fig. 21 represents a detail in plan of one of the contact control switches; Fig. 22 represents a side elevation of the same, showing the position of the parts when the contacts are closed; Fig. 23 represents a detail in side elevation of the depressor bar control cam; Fig. 24 represents an end elevation of Fig. 23; Fig. 25 represents a diagram of the solenoid control circuits; and Fig. 26 represents a diagram of the winding solenoid and cut out solenoid circuits.

Referring to the drawings, one form of the present invention is shown, the parts being enclosed within a suitable casing 10 rigidly mounted on supporting back plate 11 and having a door 12 at the front for access to the interior. The door 12 is provided with a transparent portion 13 of glass through which the record of readings or indications of the instrument can be readily viewed.

For the purpose of indicating temperature conditions at any location or at a plurality of locations, an electric meter 14 is provided having an indicating pointer 15 fixed to the electrically controlled movable element of the meter in order to swing freely in the manner required and preferably in a horizontal plane. The meter 14 may be of any construction suitable for the purpose and it is deemed unnecessary to here explain the details of its construction as it is a well known type operated by variations in the current of a thermo-couple, though in the present instance it is arranged to be controlled by a plurality of thermo-couples, each being arranged to be controlled by a separate unit, such as a furnace.

In order to successively connect the several thermo-couples with the meter 14 and thus obtain a plurality of readings for conditions at different locations, a switch 20 (Fig. 18) is provided, preferably in the form of a commutator, enclosed in a suitable two-part case 21, and comprising a non-rotatable element 22 carrying a ring contact 23 connected by a conductor 24 to one terminal of the meter 14 and a circular contact 25 connected by a conductor 26 to the other terminal of the meter 14. The element 22 also carries two sets of segmental ring contacts 27 and 28 arranged in pairs, radially considered, one of the contacts of one pair being connected by a conductor 30 to one of the terminals of a thermo-couple, and the other contact of that pair being connected by a conductor 31 to the other terminal of the same thermo-couple. It will be understood that each pair of these contact segments is similarly connected to its thermo-couple, there being the same number of pairs of segmental contacts as there are thermo-couples. The arrangement of the four sets of contacts is concentric and each is electrically insulated from all of the others. The respective pairs of segmental contacts 27 and 28 are separately connected to the meter 14 by means of two bridge contactors 32 and 33 fixed to a rotatable disk 34, also enclosed in the case 21, and arranged to locate the contactors 32 and 33 in opposed relation to the contacts carried by the element 22. The bridge contactor 32 is fixed in position to electrically connect the ring contact 23 with the selected segmental contact 27, while the bridge contactor 33 is fixed in position to electrically connect the contact 25 with the segmental contact 28 of the same pair. The contactors 32 and 33 are insulated from each other on the disk 34 as will be understood. The rotatable disk 34 is preferably numbered or provided with any suitable indicia to designate the thermo-couple selected to operate the meter, and the case 21 is suitably apertured so that the identifying indicia is visible.

In order to rotate the disk 34 and impart thereto a step by step motion which will successively connect the thermo-couples with the meter 14 in a predetermined timed relation, the disk 34 is fixed to a shaft 35, journalled in the side walls 36 and 37 of a box 38, which serves as a container for the general timing mechanism of the instrument. The shaft 35 has a ratchet 40 (Fig. 4) fast thereon and arranged to be intermittently actuated by a spring pressed pawl 41, which is pivoted to a plate 42 integral with or secured to a sleeve 43. This sleeve 43 is free to turn relative to the shaft 35 and is rigid with a gear 44 in mesh with a main driving gear 45 keyed to a main rock shaft 46 which projects at one side of the box 38 to receive an operating lever 47 fastened thereto in any fixed manner.

For recording the indications of the pointer 15 as they take place under the action of the meter 14, a mechanism is provided including a chart paper 50, an ink ribbon 51, a depressor bar 52 and a knife edge 53, (Fig. 13) this last serving as an anvil and being, in one form of the invention, supplemented by a second knife edge or member 54 mounted in close proximity to the knife edge 53 and parallel thereto.

As a means for mounting the chart paper 50 in operative relation to the marking adjuncts, a pair of brackets 55 extend outward from the back plate 11 and are arranged to form bearings for a chart supply reel or spool 56 from which the chart paper 50 is fed upwardly and over an idle roll 57 journalled in a frame 60 supported in any suitable manner from the back plate 11 or any other fixed part. Leaving the roll 57 the paper 50 passes between the pointer 15 and the knife edges 53 and 54 and over the roll 61 where it traverses across the casing door 12, (being visible through the glass 13) and around the feed roll 62 over a guide rod 63 to the reroll spool 64. The chart paper 50 is provided with edge perforations 65 to mesh with spaced projections or pins 66 on the ends of the roll 62 for properly feeding the paper. The reroll spool 64 is removably mounted in arms 67 supported by laterally disposed bars 68 in which a shaft 69 is journalled carrying the feed roll 62.

For properly tensioning the chart paper 50 and causing it to wind evenly and smoothly a rod 70 is provided extending parallel to the face of the feed roll 62 and secured at its ends to depending arms 71 which are respectively pivoted to the bars 68. Springs 72 connect the respective arms 71 to the bars 68 and operate to hold the rod 70 yieldingly against the chart paper as it passes the feed roll 62. An idle roller 73 is also arranged to bear against the chart supply spool 56 to prevent improper unrolling at the supply end.

For feeding the chart 50 step by step and in timed relation to other operations of the instrument the shaft 69 is provided with a worm gear 74 (Fig. 1) in mesh with a worm 75, which is fast on a spindle 76 suitably journalled on one of the bars 68. A bevel pinion 77 is keyed to the spindle 76 and meshes with a similar pinion 80 (Fig. 6) fast to a shaft 81 which is rotatably mounted in the walls 36 and 37 of the box 38. The shaft 81 is fast to a ratchet 82 which is arranged to be intermittently actuated by a spring pressed pawl 83 pivoted to a plate 84 integral with or secured to a sleeve 85. This sleeve 85 is free to turn relative to the shaft 81 and is rigidly fastened to a gear 86 which is driven by gears 87 and 44 from the main driving gear 45.

Motion is transmitted from the feed roll shaft 69 to the reroll spool 64 by a gear 90 keyed to the shaft 69 and meshing with a gear 91 which is in mesh with a pinion 92 keyed to the reroll clutch 93, this latter being arranged to removably hold the spool in a well known manner. The gear ratio is properly proportioned to accurately take up the chart paper with each step by step movement.

For supporting and positioning the ink ribbon 51 with respect to the recording adjuncts, a carriage 94 is provided having channels 95 arranged respectively to interfit with parts of the frame 60 for sliding movement relative thereto. The carriage 94 provides bearing supports for a ribbon supply spool 96 and a ribbon winding spool 97 suitably spaced apart, and also has two guide rolls 100 and 101 arranged to cause the ink ribbon 51 to pass transversely of the frame 60 and in a plane parallel to the chart 50 but between the said chart 50 and the knife edge or edges 53 and 54.

In order to feed the ribbon 51 in the desired manner the winding spool 97 has a worm gear 102 fixed to its shaft 103 and in mesh with a worm 104 (Figs. 10 and 12) fast to a spindle 105 which is suitably journalled on the carriage 94 and has a ratchet 106 keyed thereto. The ratchet 106 is arranged to be operated periodically by a spring pressed pawl 107 pivoted to a disk 108 formed upon a sleeve 110, which is loosely mounted on the spindle 105 and has a gear 111 fast thereon.

The gear 111 is in mesh with a pinion 112 arranged to be driven by a rack gear 113 which meshes with a rack 114 formed on one of the side members of the fixed supporting frame 60. The ratio of the train of gears just described is such as to feed the ribbon 51 in a relatively slow manner step by step and in predetermined timed relation to other operations of the recording mechanism.

In the present form of the invention employed for multiple recording it is desirable to produce record marks upon the chart 50 by which each mark identifies the particular unit making the record and for that purpose the ribbon 51 is subdivided as to color into a plurality of strips 115 each of a color different from any of the other strips. The number of colors corresponds to the number of furnaces or other devices the temperatures or other conditions of which are to be recorded, and in the present form five such strips are shown by way of example, though as the instrument here described is arranged to record but eight units one of the strips 115 is idle while each of the other strips serves to identify two units, this being accomplished by a single dot and a double dot from each strip as will be presently described. It will be understood, however, that this identifying record construction is but one way of accomplishing the desired end and that the construction may be variously modified within the scope of the invention.

One means for shifting the ribbon carriage 94 to locate the particular strip 115 for recording the corresponding unit indication, consists in providing pins 120 at opposite sides respectively of the carriage 94 and projecting laterally to seat respectively between the bifurcated ends 121 and 122 of two rock arms 123 and 124 (Fig. 3) which are fast to a rock spindle 125. The rock spindle 125 is journalled in lugs 126 depending respectively from the brackets 55, and receives its motion from an arm 127 fast thereon and connected by an adjusting stud 130 to a link 131 which is pivoted on the spindle 125, and has a bifurcated end 132 straddling a pin 133 fixed to a disk 134. The arm 127 is provided with a slot 135 through which the stud 130 passes, so that the carriage 94 can be adjusted to assume a rest position with the particular ribbon strip in alinement with the knife edge mechanism. The disk 134 is fast to a rotary shaft 136 journalled in the walls 36 and 37 of the box 38 and is arranged to be intermittently actuated by a suitable mechanism such as a Geneva wheel comprising a gear 140 fast to the rotary shaft 136, arranged to be driven by a two segment gear 141, and two locking disks 142 and 143 (Fig. 7), the former being fast to the shaft 136 and having four cut away portions 144 in its periphery, each having a contour formed on the same radius as the disk 143. The disk 143 is similarly cut away at its periphery and made fast to a driving shaft 145 in position to mesh with the disk 142, so that when the gear 140 is out of mesh with either of the gear segments 141 it will be held against rotation. The segmental gear 141 is also fast to the driving shaft 145, this latter being journalled in the walls 36 and 37 and actuated by a ratchet 146 fast thereon which is driven by a spring pressed pawl 147 pivoted to a plate 150 integral with or secured to a sleeve 151 (Fig. 4) loosely mounted on the shaft 145. The sleeve 151 has a pinion 152 keyed thereto and in mesh with the main driving gear 45.

In order to positively lock the Geneva gear between its operating movements a star wheel 153 is fast to the shaft 145 and has four peripheral radial slots 154 which are arranged to successively receive a locking detent 155 integral with an arm 156 suitably pivoted to a fixed part and normally held pressed in locking position by a spring 157. For removing the detent 155 to permit the required movement of the Geneva wheel, the arm 156 has a finger 158 pivoted thereon and extending into the path of a trip 160 keyed to the main shaft 46, being supported in operative position by a fixed pin 161 or other equivalent means. The parts are so arranged that as the trip 160 moves forwardly it meets the finger 158, just prior to motion being transmitted to the intermittently acting mechanism, and thereby pushes the arm 156 in a direction to remove the detent 155 to release the Geneva gearing; when the trip 160 withdraws, the spring 157 returns the arm 156 and the detent 155 again interlocks with the star wheel 153. From the foregoing it will be evident that the intermittent gearing causes the pin 133 to assume four rest positions and in consequence the ribbon carriage 94 will have four different rest positions with respect to the recording devices, all as will be more fully explained in the description of the operation of the instrument as a whole.

As a means for causing a single dot or indication to be made upon the chart 50 the knife edge 53 is provided, being fixedly mounted transversely of the stationary frame 60 parallel to and beneath the ribbon 51.

For causing a double dot or other double record to be registered upon the chart 50 the knife edge 54 (Fig. 14) is provided, the same being movably mounted parallel to the knife edge 53 and relatively close thereto. The knife edge 54 is rigidly secured to two studs 161 which pass freely through a bar 162 fast to the frame 60, the studs 161 having a neat fit to permit the knife edge 54 to rise and fall the necessary distance but at the same time maintaining the knife edge 54 parallel to the knife edge 53. The respective studs 161 are encircled by coiled springs 163 which act between the knife edge 54 and the fixed bar 162 so that the knife edge 54 is returned to its normal position in the same horizontal plane with the knife edge 53.

In order to lower the knife edge 54 below the knife edge 53 at predetermined intervals two arms 164 are secured to the studs 161 respectively and have their opposite ends rigid with a spindle 165 journalled in the frame 60. This spindle 165 is arranged to be rocked intermittently by an arm 166 fixed thereto at one end and at its opposite end pivoted at 167 to a link 168, which has pivotal connection with a cam lever 170 pivoted at 171 to the box 38. The other end of the cam lever 70 is free and located in the path of movement of a cam 172 which is fast to the driven shaft 145 of the Geneva intermittent motion mechanism. The cam 172 in the present instance is substantially elliptical for the purpose of giving two operating strokes and two rest periods for each revolution of the shaft 145, thereby alternately lowering the knife edge 54 and permitting it to return to its normal position; whereby a single and a double indication take place through the same color strip as will be explained.

For causing the pointer 15 to strike the chart 50 and through the anvil action of the knife edge 53 or both of the knife edges 53 and 54 record an indication or a plurality of indications by the ribbon 51 being pressed momentarily against the chart 50, the depressor bar 52 is provided, the same being preferably U-shaped with its sides 173 fixed to a rock spindle 174 and its connecting bar 52 being substantially parallel to and above the knife edges 53 and 54 and also above the path of the pointer 15, so that in any operative position of the pointer 15 it will be struck by the depressor bar 52 when the latter falls for the purpose of making a record. In the present construction the depressor bar 52 is arranged to drop by gravity, being normally held above and out of contact with the pointer 15 by an arm 175 (Fig. 3) fast to the spindle 174 at one end and at its other end pivotally secured to a connecting rod 176 which is pivoted to a lever 177, this last member being pivoted at 180 to the wall 36 and having its free end held in raised position by a knife edge member 181 resting upon the surface of a cam 182. The cam 182 is fast to a shaft 183 and has three release notches so that for each revolution of the shaft 183 the lever 177 is released three times to drop the depressor bar 52. The shaft 183 is fixed to a ratchet 184 (Fig. 4) arranged to be given a step by step movement by a spring pressed pawl 185 pivoted to a plate 186 rigid with a sleeve 187 which is loose on the shaft 183 and secured to a pinion 190 in mesh with the main driving gear 45.

In order to insure the depressor bar 52 dropping before any change in the position of the recording mechanism takes place, the shaft 184 has a notched disc 191 (Fig. 23) fast thereon and arranged to engage a spring pressed pivoted finger 192 having a lug 193 in the path of the disc 191 to prevent turning of the shaft 183 in its operative direction unless the lug 193 is removed. The free end of the finger 192 is located in the path of movement of a set screw 194 or equivalent means projecting from the lever 177, so that when the lever 177 is released by the cam 132 a fraction of a second will elapse before the set screw 194 strikes and removes the finger 192 from locking engagement with the disc 191. This insures the depressor bar 52 operating in its proper timed relation to the other parts.

For the purpose of oscillating the lever 47 periodically, to cause the controlled mechanisms to operate, it is connected by a crank pin 195 and clamping screw 196 (Fig. 15) to a yoke or socket 197 fixed to a crank arm 198 which is keyed or otherwise made fast to a rock shaft 200. In the present construction the rock shaft 200 is journalled transversely of a casing 201 and is oscillated by a gear segment 202 keyed thereon and in mesh at diametrically opposite points with two racks 203 and 204 (Fig. 16) which are respectively attached in a rigid manner to two plates 205 and 206 and properly guided by rollers 207 and 208 journalled for free rotation. The plate 205 is made fast to a double core 210 of a pair of solenoids 211, and the plate 206 is made fast to a double core 212 of a second pair of solenoids 213, the pairs of solenoids 211 and 213 being arranged to be alternately energized to cause the desired oscillation of the shaft 200.

In order to alternately energize the solenoids 211 and 213 to operate them in a predetermined timed relation the solenoid 211, which may be called the front solenoid, is included in a circuit receiving current from the main terminals 214 and 215 and including a conductor 216 connected to a spring arm 217 carrying a contact 218 and a conductor 220 connected to a spring arm 221 carrying a contact 222, the two arms 217 and 221 being mounted in insulated relation upon a bracket 223 with the contacts 218 and 222 in opposed relation and normally spaced apart so that the circuit is open. The solenoid 213, which may be called the back solenoid, is included in a circuit receiving current from the terminals 214 and 215, or any other source of current, and including a conductor 224 connected to a spring arm 225 carrying a contact 226, and a conductor 227 connected to a spring arm 228 carrying a contact 230, the two arms 225 and 228 being mounted in insulated relation upon a bracket 231 with the contacts 226 and 230 in opposed relation and normally spaced apart so that the circuit is open. The two sets of contacts are arranged to be alternately closed by a two point cam 232, common to both sets (Fig. 2), which is fast to a spindle 233 driven by a suitable timing mechanism such as a clock work 234. The cam 232 is timed in a predetermined manner to close one set of contacts, say 218 and 222, and then after an interval, for example fifteen seconds, close the other set of contacts 226 and 230, one set always being open when the other set is closed to thus alternately energize the front solenoid 211 and the back solenoid 213, whereby the shaft 200 is oscillated in the required manner. In connection with the contact carrying arms it should be noted that in each pair the ends of the arms, which rest upon the cam 232 (Fig. 22), are bent to lie in the same plane, though without touching, and the end of one arm is slightly longer than the cooperating arm, so that as the cam 232 rotates slowly the shorter arm will snap off the cam first and thereby close the opposed contacts momentarily. As soon as the longer arm snaps from the cam 232 the contact is broken and the controlled circuit is again open.

For the purpose of automatically winding the clock mechanism 234, it is provided with a winding shaft 235 journalled in any suitable manner and arranged to wind the main spring 236 of the clock mechanism. In the present construction this winding shaft 235 has a ratchet 237 fixed thereto, which is held against reverse turning by a spring pressed pawl 240 and is arranged to be given a step by step movement by a spring pressed pawl 241 pivoted to the short arm of a lever 242 which is pivoted for oscillating movement and has a long arm extending laterally and loosely held adjacent its end by a slotted head 243. In order to reciprocate the head 243 it is made fast to a rod 244 which is rigidly secured to the core 245 of a pair of solenoids 246, the said core 245 being located at the opposite ends of the solenoids 246 from the head 243, so that when the solenoids 246 are energized the core 245 is drawn up to shift the lever 242 and move the pawl 241 to engage another tooth of the ratchet 237. The weight of the core 245 taken with the relatively long leverage of the lever 242 is sufficient to advance the ratchet 237 each time the solenoid 246 is deenergized, so that the step by step winding takes place by gravity action and consequently should the main spring 236 become fully wound the core 245 is held suspended and the winding ceases for the time being.

As a means for periodically energizing the solenoid 246, one end of the solenoid winding is connected by a conductor 250 to one of the line terminals, say 214, while the other end of the solenoid winding is connected by a conductor 251 to a spring arm 252 of a circuit closing device including a second spring arm 253, a bracket 254, by which both the arms 252 and 253 are supported at one end in insulated relation, two contacts 255 and 256 and a rotatable circuit closer 257. The contact 255 is fixed to the arm 252 in opposed relation to the contact 256, which is fixed to the arm 253, and the two contacts are normally spaced apart. The ends of the arms 252 and 253 are arranged to lie in the same plane, out of contact, and in the path of movement of the circuit closer 257, which is here in the form of a four point cam fixed to a driven staff 258 of the clock mechanism. Also one of the arms 252 or 253 is shorter than the other and therefore snaps off the cam points before the longer arm and during this fractional interval the two contacts meet momentarily to close the circuit. The circuit is completed from the circuit closing means by a conductor 260 which is connected from the arm 253 to the other line terminal 215.

In order to wind the clock mechanism 234 manually for starting purposes, the winding shaft 235 projects at one end through the casing 261 and has a bevel pinion 262 keyed thereon in mesh with a like pinion 263 fast to a stud shaft 264 arranged to be manually operated by a knurled thumb piece 265 or any other equivalent means whereby the pinions can be operated for winding purposes.

For the purpose of stopping the clock mechanism and the adjuncts controlled thereby if the main current is cut off, from the recorder a solenoid 270 is provided having its winding connected in parallel across the terminals 214 and 215 by conductors 271 and 272, while its core 273 is joined to a lever 274 pivoted at 275. The free end of the lever 274 is arranged to suspend a brake shoe 276 in close proximity to the periphery of a balance wheel 277 of the clock mechanism, the arrangement being such that when the solenoid 270 is energized the brake shoe 276 is held away from the balance wheel 277, but when the current is cut off and the solenoid 270 is deenergized then the brake shoe 276 rests against the balance wheel 277 with sufficient friction to stop the entire clock mechanism.

To protect the several solenoid controlling means it is preferable to provide resistance coils 280 which are respectively included in the solenoid winding circuits as will be understood. Further, for convenience in making the electrical connections of the instrument a plurality of binding bars 281 are provided, the same, in this form of the invention, serving to connect the respective circuit breaking devices to the several solenoid circuits. Also a plurality of binding posts 282 are arranged in pairs at convenient locations upon the casing 10, each pair being joined by conductors to its thermo-couple at the distant point, in the usual manner.

For facilitating the reading of the chart 50, which is preferably of the transparent type, it is arranged to pass back of the casing glass 10 but in front of a plate 283 having an enamel or any other suitable surface against which the record chart is clearly outlined for taking readings of recorded data.

In describing the operation of the instrument it will be assumed that the chart 50 and ribbon 51 are in place ready for operation; that the binding posts 282 are operatively connected to the respective controlling thermo-couples and also to the commutator switch 20; that the operating parts for the rock shaft 200 are in the position shown in Fig. 16; and that the clock 234 has been wound. As soon as the current is turned on the solenoid 270 is energized and pulls its core 273 to shift the lever 274 in the proper direction to withdraw the brake shoe 276 from engagement with the balance wheel 277 to allow the clock mechanism 234 to start and continue running as long as the solenoid 270 is energized.

The rotation of the cam circuit closer 257 causes the contacts 255 and 256 to meet momentarily at intervals during the revolution of staff 258 thereby closing the circuit of the solenoid 246 periodically, whereby the core 245 is raised each time the solenoid 246 is energized and falls by gravity when the solenoid 246 is deenergized. The movement of the core 245 by gravity is the working stroke and causes the lever 242 to advance the ratchet 237 to wind the clock mechanism and maintain it in a wound condition.

The spindle 233 is now rotating slowly and consequently the cam 232 reaches a position where the spring arm 228 is released and brings the contacts 226 and 230 into engagement to close the circuit including the back solenoid 213. The energizing of the solenoid 213 shifts the core rack 204 to cause the gear segment 202 to rock the shaft 200 in a direction to swing the crank arm 198 in a counter-clockwise direction whereby motion is transmitted through the operating lever 47 to the main shaft 46 of the ratchet control mechanism in the ratchet box 38. As viewed in Fig. 6, the partial rotation of the shaft 46 turns the main gear 45 counter-clockwise to cause the Geneva gear mechanism 140 and 141 to turn through a quarter revolution and also turn the cam 172 through a quarter revolution. The Geneva gearing is released by the trip 160 engaging the finger 158 to remove the arm 156 from its locking position, and if the segment 141 is in mesh with the gear 140 the shaft 136 is turned through a quarter revolution and the ribbon carriage 94 moved to bring the required ribbon color above the knife edges 53 and 54 to correspond to the position of the parts at that time. The lateral travel of the carriage 94 causes the ribbon 51 to receive a feeding movement as has been described. The movement of the cam 172 in this instance causes the lever 170 to actuate the parts connected to the movable knife edge 54 and lower this edge below the fixed knife edge 53. The chart 50 has also been given a step movement by the foregoing action of the main gear 45 and the instrument is now in position to record a single dot, say of red color, upon the chart.

At the end of a predetermined interval, for example fifteen seconds, the clock driven spindle 233 brings the cam 232 to a position where the spring arms 217 and 218 come together to close the circuit of the front solenoid 211 through the contacts 218 and 222. The energizing of this solenoid 211 swings the gear 202 in a direction reverse to its former movement and thereby returns the crank arm 198, causing the operating lever 47 to partially rotate the main gear 45 in a clockwise direction as viewed in Fig. 6. This action turns the cam 182 to drop the lever 177 and through the connections 176 and 175 permits the depressor bar 52 to fall by gravity whereby the pointer 15 strikes the chart 50 above the knife 53 and registers a single dot of red color by means of the interposed ribbon 51. The result is an indication upon the chart 50 of a temperature condition at a location controlled by a certain one of the thermo-couples. Following the operation of the depressor bar 52 the continued movement of the main gear 45 causes the ratchet 40 to advance the commutator switch 20 one step to connect a second thermo-couple to the meter 14 and, of course, disconnecting the thermo-couple which has just recorded.

After another period of fifteen seconds the back solenoid 213 is again energized to cause the main gear 45 to swing counter-clockwise but on this stroke the Geneva gearing has a rest period so the ribbon carriage 94 remains in its former position with the red color still above the knife edges 53 and 54. This stroke, however, causes the cam 172 to release the knife edge 54, which returns to normal position under the action of the springs 163 ready to record a double dot upon the chart 50. With the parts so positioned the front solenoid 211 is energized, after the fifteen second period and the main gear 45 again reversed in position, thereby releasing the depressor bar 52 with the result that two red dots appear on the chart as the record of the second thermo-couple. Following the action of the depressor bar 52, the commutator switch 20 is again actuated to connect the third thermo-couple to the meter 14 for the next recording stroke. The intermittent action of the Geneva gearing sets the ribbon color for two thermo-couples, while the movable knife is actuated to distinguish between these two thermo-couples by indicating a single dot for one and a double dot for the other. When this has taken place the Geneva gearing has reached the end of its rest period and causes the ribbon carriage to shift a definite distance to bring another color to operative position for two other thermo-couples, and in this manner the cycle continues with the parts working in accurate timed relation.

Having thus described our invention, we claim:

1. In a recording instrument, a meter arranged to respond to a plurality of electrical control circuits one at a time, means for connecting said meter with the respective control circuits, a record strip, means for recording on said strip the respective indications of said meter, and means including a movable anvil element to vary the number of the recorded indications for identifying the recorded indications with the respective control circuits.

2. In a recording instrument, a meter arranged to respond to a plurality of electrical control circuits one at a time, means for connecting said meter with the respective control circuits, a record strip, means for recording on said strip the respective indications of said meter, and means, including a mechanism to vary both the number and the color of the recorded indications, for identifying the recorded indications with the respective control circuits.

3. In a recording instrument, a meter arranged to respond to a plurality of electrical control circuits one at a time, means for connecting said meter with the respective control circuits, a record strip, means for recording on said strip the respective indications of said meter, and means, including a movable knife edge to vary the number of the recorded indications, for identifying the recorded indications with the respective control circuits.

4. In a recording instrument, a meter arranged to respond to a plurality of electrical control circuits one at a time, means for connecting said meter with the respective control circuits, a record strip, means for recording on said strip the respective indications of said meter, and means, including a movable knife edge, and a multi-colored ribbon to vary both the number and color of the recorded indications, for identifying the recorded indications with the respective control circuits.

5. In a recording instrument, a meter arranged to respond to a plurality of electrical control circuits one at a time, means for connecting said meter with the respective control circuits, a record strip, means including a knife edge for recording on said strip the respective indications of said meter, a movable knife edge arranged for recording purposes, and means to vary the position of said movable knife edge at predetermined intervals to cause a single indication to be recorded to identify one control circuit and a double indication to be recorded to identify another control circuit.

6. In a recording instrument, a meter arranged to respond to a plurality of electrical control circuits one at a time, means for connecting said meter with the respective control circuits, a record strip, means including a knife edge for recording on said strip the respective indications of said meter, a movable knife edge arranged for recording purposes, means to vary the position of said movable knife edge at predetermined intervals to cause a series of single indications to be recorded to identify certain of said control circuits and a series of double indications to be recorded to identify the remaining control circuits, and means to vary the color of the single and double indications respectively for identifying the respective control circuits of each series of indications.

7. In a recording instrument, a meter arranged to respond to a plurality of electrical control circuits one at a time, means for connecting said meter with the respective control circuits, a record strip, means including a knife edge for recording on said strip the respective indications of said meter, a movable knife edge arranged for recording purposes, means to vary the position of said movable knife edge at predetermined intervals to cause a series of single indications to be recorded to identify certain of said control circuits and a series of double indications to be recorded to identify the remaining control circuits, and means, including a multi-colored ribbon, for identifying the respective control circuits of each series of indications.

8. In a recording instrument, a meter arranged to respond to a plurality of electrical control circuits one at a time, means for connecting said meter with the respective control circuits, a record strip, means including a knife edge for recording on said strip the respective indications of said meter, a movable knife edge arranged for recording purposes, means to vary the position of said movable knife edge at predetermined intervals to cause a series of single indications to be recorded to identify certain of said control circuits and a series of double indications to be recorded to identify the remaining control circuits, means, including a multi-colored ribbon, for identifying the respective control circuits of each series of indications, and means to indicate the particular control circuit connected to said meter for recording purposes.

9. In a recording instrument, a meter arranged to respond to a plurality of electrical circuits one at a time, means for connecting said meter with the respective control circuits, a record strip, means, including a plurality of knife edges for recording on said strip the respective indications of said meter, means for intermittently rendering one of said knife edges inoperative for recording purposes, a multi-colored ribbon arranged between said record strip and said knife edges, and means for varying the relative positions of said knife edges and said ribbon to cause different colors to be recorded to identify certain of said control circuits.

10. In a recording instrument, a meter arranged to respond to a plurality of electrical circuits one at a time, means for connecting said meter with the respective control circuits, a record strip, an intermittently actuated mechanism for feeding said record strip, means, including a plurality of knife edges for recording on said strip the respective indications on said meter, means for intermittently rendering one of said knife edges inoperative for recording purposes, a multi-colored ribbon arranged between said record strip and said knife edges, and means for varying the relative positions of said knife edges and said ribbon to cause different colors to be recorded to identify certain of said control circuits.

11. In a recording instrument, a meter arranged to respond to a plurality of electrical circuits one at a time, means for connecting said meter with the respective control circuits, a record strip, means, including a plurality of knife edges for recording on said strip the respective indications of said meter, means for intermittently rendering one of said knife edges inoperative for recording purposes, a multi-colored ribbon arranged between said record strip and said knife edges, an intermittently actuated mechanism for feeding said ribbon, and means for varying the relative positions of said knife edges and said ribbon to cause different colors to be recorded to identify certain of said control circuits.

12. In a recording instrument, a meter arranged to respond to a plurality of electrical circuits one at a time, means for connecting said meter with the respective control circuits, a record strip, an intermittently actuated mechanism for feeding said record strip, means, including a plurality of knife edges for recording on said strip the respective indications of said meter, means for intermittently rendering one of said knife edges inoperative for recording purposes, a multi-colored ribbon arranged between said record strip and said knife edges, an intermittently actuated mechanism for feeding said ribbon, and means for varying the relative positions of said knife edges and said ribbon to cause different colors to be recorded to identify certain of said control circuits.

13. In a recording instrument, a meter arranged to respond to a plurality of electrical circuits one at a time, means for connecting said meter with the respective control circuits, a record strip, means, including a plurality of knife edges for recording on said strip the respective indications of said meter, means for intermittently rendering one of said knife edges inoperative for recording purposes, a multi-colored ribbon arranged between said record strip and said knife edges, and means intermittently actuated for varying the relative positions of said knife edges and said ribbon to cause different colors to be recorded to identify certain of said control circuits.

14. In a recording instrument, a meter arranged to respond to a plurality of electrical circuits one at a time, means for connecting said meter with the respective control circuits, a record strip, an intermittently actuated mechanism for feeding said record strip, means, including a plurality of knife edges for recording on said strip the respective indications of said meter, means for intermittently rendering one of said knife edges inoperative for recording purposes, a multi-colored ribbon arranged between said record strip and said knife edges, an intermittently actuated mechanism for feeding said ribbon, means for varying the relative positions of said knife edges and said ribbon to cause different colors to be recorded to identify certain of said control circuits, and time controlled means for operating all of said intermittently actuated mechanisms in a predetermined cycle of operations.

15. In a recording instrument, a meter arranged to respond to a plurality of electrical circuits one at a time, means for connecting said meter with the respective control circuits, a record strip, an intermittently actuated mechanism for feeding said record strip, means, including a plurality of knife edges for recording on said strip the respective indications of said meter, means for intermittently rendering one of said knife edges inoperative for recording purposes, a multi-colored ribbon arranged between said record strip and said knife edges, an intermittently actuated mechanism for feeding said ribbon, means for varying the relative positions of said knife edges and said ribbon to cause different colors to be recorded to identify certain of said control circuits, and means including a solenoid for operating all of said intermittently actuated mechanisms in predetermined timed relation.

16. In a recording instrument, a meter arranged to respond to a plurality of electrical control circuits one at a time, means for successively connecting said meter with said control circuits, a record strip, feeding means for said strip, means for recording on said strip the respective indications of said meter, a power unit electrically controlled and operative to actuate all of said means, and means to automatically stop said power unit when the operating current is cut off.

17. In a recording instrument, a meter arranged to respond to a plurality of electrical control circuits one at a time, means for selectively connecting said meter with the respective control circuits, a record strip, means for recording on said strip the respective indications of said meter, a time controlled mechanism for actuating both said selecting and said recording means, and means for delaying the operation of said selecting means until said recording means has operated.

18. In a recording instrument, a meter arranged to respond to a plurality of electrical control circuits one at a time, means for selectively connecting said meter with the respective control circuits, a record strip, means for recording on said strip the respective indications of said meter, a time controlled mechanism for actuating both said selecting and said recording means, and means, including a rotatable toothed wheel, for delaying the operation of said selecting means until said recording means has operated.

19. In a recording instrument, a meter arranged to respond to a plurality of electrical control circuits one at a time, means for selectively connecting said meter with the respective control circuits, recording means including a movable knife edge, an ink ribbon, a record strip, a depressor, and means for feeding said strip, an electric circuit including a solenoid, means controlled by said solenoid for operating said knife edge, said ribbon and said strip feeding means in a predetermined manner, respectively, a second electric circuit including a solenoid, means controlled by said second circuit solenoid for operating said selecting means and causing said depressor to operate respectively, and time controlled means for closing said solenoid circuits.

20. In a recording instrument, a meter arranged to respond to a plurality of electrical control circuits one at a time, means for selectively connecting said meter with the respective control circuits, recording means including a movable knife edge, an ink ribbon, a record strip, a depressor, and means for feeding said strip, an electric circuit including a solenoid, means controlled by said solenoid for operating said knife edge, said ribbon and said strip feeding means in a predetermined manner respectively, a second electric circuit including a solenoid, means controlled by said second circuit solenoid for operating said selecting means and causing said depressor to operate respectively, and time controlled means for alternately closing said solenoid circuits at predetermined intervals.

21. In a recording instrument, a meter arranged to respond to a plurality of electrical control circuits one at a time, means for selectively connecting said meter with the respective control circuits, recording means including a movable knife edge, an ink ribbon, a record strip, a gravity actuated depressor, means for holding said depressor inoperative, and means for feeding said strip, an electric circuit including a solenoid, means controlled by said solenoid for operating said knife edge, said ribbon and said strip feeding means in a predetermined manner respectively, a second electric circuit including a solenoid, means controlled by said second circuit solenoid for operating said selecting means and releasing said depressor respectively, and time controlled means for alternately closing said solenoid circuits.

22. In a recording instrument, a meter arranged to respond to a plurality of electrical control circuits one at a time, means for selectively connecting said meter with the respective control circuits, recording means including a movable knife edge, an ink ribbon, a record strip, a gravity actuated depressor, means for holding said depressor inoperative, and means for feeding said strip, an electric circuit including a solenoid, means controlled by said solenoid for operating said knife edge, said ribbon and said strip feeding means in a predetermined manner respectively, a second electric circuit including a solenoid, means controlled by said second circuit solenoid for operating said selecting means and releasing said depressor respectively, and an electrically controlled power unit for alternately closing said solenoid circuits at predetermined intervals.

23. In a recording instrument, a meter arranged to respond to a plurality of electrical control circuits one at a time, means for connecting said meter with the respective control circuits, a record strip, means for recording on said strip the respective indications of said meter, and means including a movable element and a multi-colored ribbon to vary both the number and color of the recorded indications for identifying the recorded indications with the respective control circuits.

24. In a recording instrument, a meter, a plurality of electrical circuits, means for connecting said meter with the respective circuits to cause said meter to indicate operating conditions, a record strip, means for recording on said strip the respective indications of said meter, and means including a movable anvil-like member to vary the character of the recorded indications for identifying the recorded indications with the respective circuits.

25. In a recording instrument, a meter, a plurality of circuits, means for connecting said meter with the respective circuits in a predetermined manner to cause said meter to function in accordance with the circuit connected, a record strip, means including a hammer element and an anvil element for recording on said strip the respective indications of said meter, said hammer and anvil elements being separated by said record strip, and means for automatically varying said anvil element, whereby the recorded indications identify the respective circuits.

26. In a recording instrument, a meter arranged to respond to a plurality of electrical control circuits one at a time, means for selectively connecting said meter with said control circuits, a record strip, means including an anvil element for recording on said strip the respective indications of said meter, and means to vary the position of said anvil element to cause different indications to be recorded to identify different circuits respectively.

27. In a recording instrument, a meter, a plurality of control circuits, means for selectively connecting said meter with said control circuits, a record strip, means including an anvil element for recording on said strip the respective indications of said meter, means to vary the position of said anvil element to identify certain of said control circuits, and means including a multi-colored ribbon operating in conjunction with said anvil element for identifying the remaining control circuits.

Signed at Philadelphia, county of Philadelphia, State of Pennsylvania, this 25 day of June, 1920.

RICHARD P. BROWN.
FRITZ WAGNER.